Nov. 29, 1949　　　　W. WELCH, JR　　　　2,489,345
BOILER FEED-WATER TEMPERATURE REGULATOR
Filed Aug. 22, 1944　　　　　　　　　　2 Sheets-Sheet 1

William Welch, Jr.
INVENTOR.
BY Gerald B. Tjoflat
his Attorney

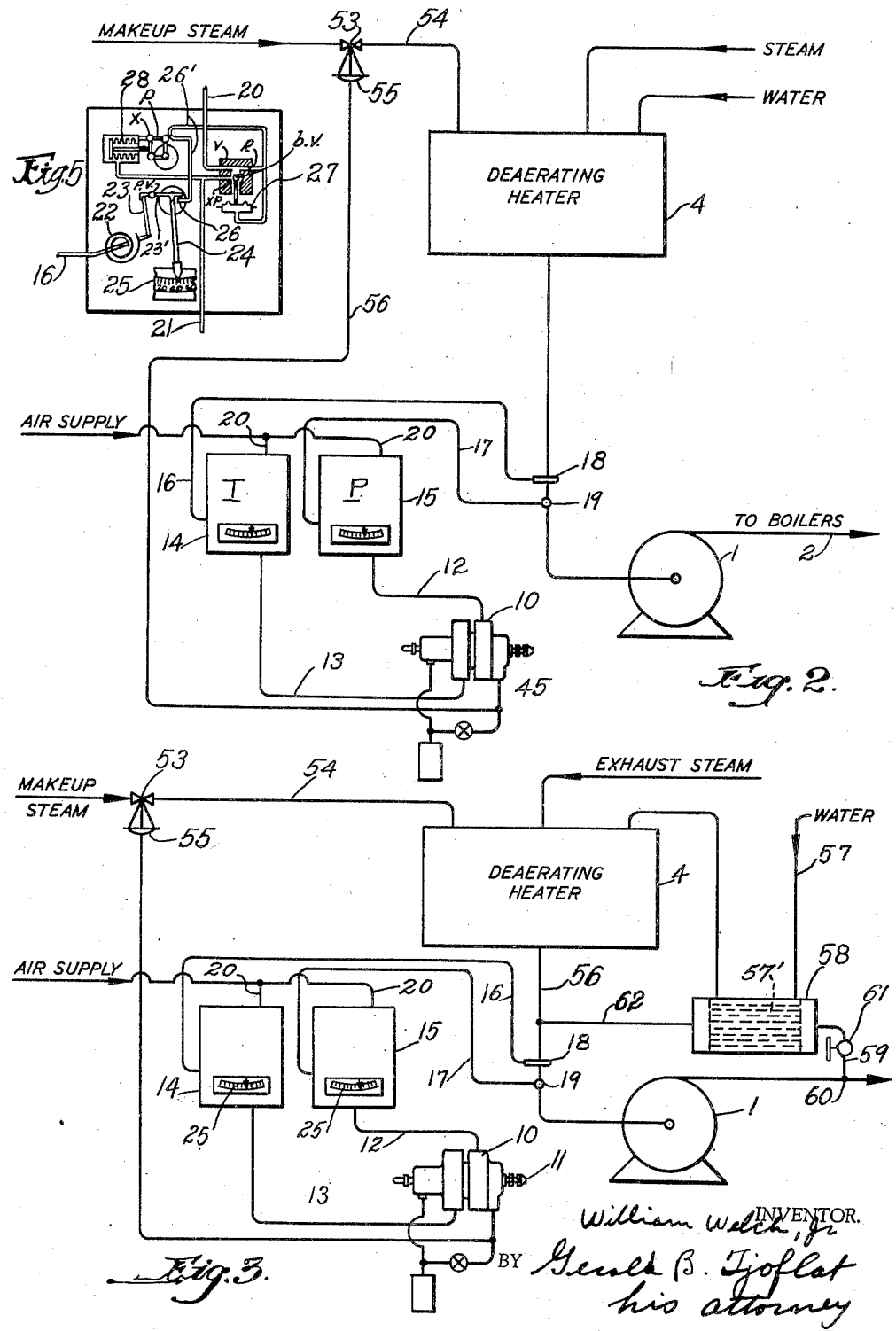

Patented Nov. 29, 1949

2,489,345

UNITED STATES PATENT OFFICE 2,489,345

BOILER FEED-WATER TEMPERATURE REGULATOR

William Welch, Jr., Westbury, N. Y.

Application August 22, 1944, Serial No. 550,660

3 Claims. (Cl. 236—1)

This invention relates to a system of control for regulating the boiler feed water temperatures in accordance with the static pressure of the water on the suction side of the boiler or feed water pump.

It is among the objects of the invention to provide a system of control responsive to a predetermined pressure temperature of the boiler feed water to regulate the temperature of the feed water in accordance with the pressure of the water to prevent excessive cavitation and flashing.

It is a further object of the invention to provide a system for controlling pressure temperatures of boiler feed water by regulating the volume of steam or water, or both, delivered to the deaerating heater or direct to the feed water on the intake side of the pump.

It is still another object of the invention to provide a system of control of the above designated character utilizing a pressure totalizer for operating the regulating valves of a flow control system in response to changes in temperature and pressure of fluids flowing in said system, and which shall operate in response to a pressure differential established through auxiliary equipment.

Figure 1:
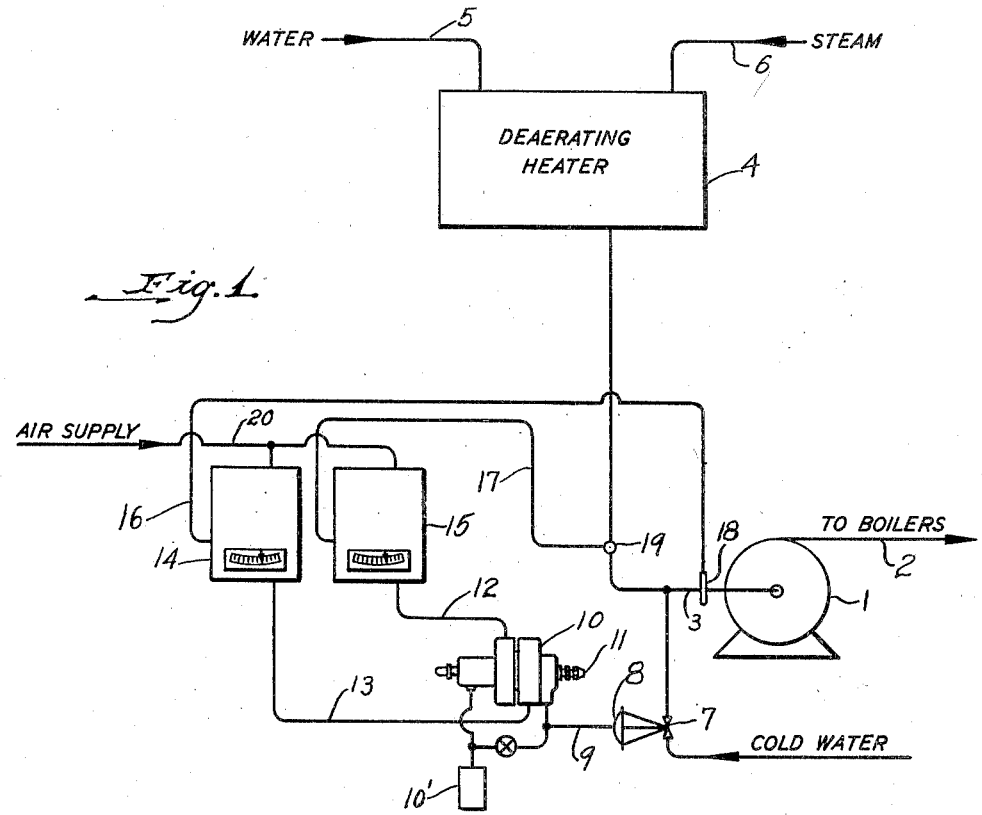
Figure 4:
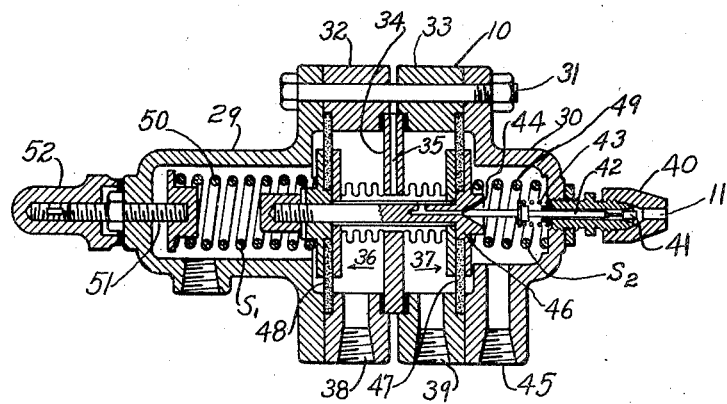

These and other objects of the invention will become more apparent from a consideration of the accompanying drawing constituting a part hereof, in which Fig. 1 is a diagrammatic view of a system of control embodying the principles of this invention;

Fig. 2 a similar view of a modified arrangement of the operating parts;

Fig. 3 a diagrammatic view of still another modification of the control system;

Fig. 4 a vertical cross-sectional view taken longitudinally of a pressure totalizer employed for transmitting sending pressures in response to temperature pressure changes in a flow line; and Fig. 5 a diagrammatic view of a pneumatic transmitter.

With reference to the several figures of the drawing, numeral 1 designates a pump for delivering feed water to boilers as diagrammatically shown by the arrow numbered 2, the inlet side of the pump being connected by a flow line 3 to a deaerating heater 4 which is supplied by the line 5 with water and by the line 6 with steam.

It is desirable that the feed water be delivered to the boilers at relatively high temperatures, and and it is therefore preheated in the deaerating heater 4 to eliminate the oxygen content and reduce or eliminate the need of scavenging chemicals for freeing the water of excessive oxygen. In systems of this kind there is the danger of flashing on the intake side of the feed water pump which results if the static pressure of the water drops below the flashing point if the temperature of the water is excessive. Consequently the invention deals with the regulation of the feed water temperature at the inlet side of the boiler feed pump by regulating the make-up steam or water supplied to the deaerating heater or directly to the pump feed line. In the system of control shown in Fig. 1, the temperature is regulated by controlling the cold water supply to the suction side of the pump through a valve 7 which is actuated by a pressure operator 8 connected by conduit 9 to a pressure totalizer 10 having a connection 11 to a source of constant pressure which is delivered to the valve operator 8 in accordance with the difference between the pressure in lines 12 and 13 connected to the totalizer 10. The pressures in lines 12 and 13 is developed by transmitters 14 and 15 both of which are connected to a source of air pressure as marked by the arrow. Transmitters 14 and 15 are connected by conduits 16 and 17 to a thermal responsive element 18 and a pressure connection 19, respectively, of the pump feed line 3. The output or sending pressure of transmitter 14 is proportional to the temperature of the feed water flowing to the boiler feed pump. Similarly, the output or sending pressure of transmitter 15 which is delivered to line 12 is proportional to the pressure of the feed water at the pressure connection 19. So long as the relationship between temperature of the feed water at its particular pressure is of a desired value, flashing of the feed water in the feed pump will not take place. If this relationship departs from a desired value, the pressures in lines 12 and 13 will become unbalanced in a direction which will cause totalizer 10 to so actuate valve 7 that the proper amount of cold water will be introduced into the feed water line of the feed pump intake to restore the proper pressure temperature relationship so that flashing of the feed water into steam will not occur in the feed pump.

The transmitters 14 and 15 are shown in Fig. 5 of the drawings, in which the conduit 20 is the connection to the air supply which is at constant pressure, and the conduit 21 the sending line corresponding to the connections 12 and 13 of the totalizer 10. In Fig. 5 the conduit 16 is connected to a Bourdon coil 22 which responds to temperature changes of the liquid in conduit 16 to expand or tend to straighten out, and movement of the coil, which is connected by linkage 23 to a pointer 24, will actuate the latter to indicate temperature changes on a scale 25. Linkage 23 also operates a valve 26 that effects a pressure change in the capsular chamber 27 which changes the pressure on the bellows 28 to increase or decrease the air supply transmitted by the conduit 21 to the totalizer operator 10.

The transmitter shown in Fig. 5 is like the one shown in Taylor Instrument Companies Bulletin 98,156, September 1940, entitled "Taylor Remote Pneumatic Transmission System." This transmitter operates as follows when the temperature or pressure being measured is increasing. The increased pressure or temperature acts to straighten Bourdon tube 22 whereupon link 23 moves downwardly causing arm 23' to turn counterclockwise about its pivot P. V. As the arm 23' turns in this direction, it moves away from jet valve 26 allowing an increased flow of air from pipe 20 through a valve V and restriction R to capsule 27 and branch pipe 26' which terminates in valve jet 26. Branch pipe 26' is carried by a parallelogram P pivoted at X. The reduced pressure acting on capsule 27 causes it to contract and move a ball valve b. v. towards exhaust port X. P., whereby an increased pressure is delivered to bellows 28. Bellows 28 therefore contracts and turns parallelogram P counterclockwise whereby branch pipe 26' is raised and jet valve 26 moved toward arm 23' to decrease the flow of air from the jet. This results in the pressure acting on capsule 27 to increase and open the ball valve to allow greater exhaust of air and reducing slightly the pressure on bellows 28. Bellows 28 and parallelogram P act as a reset for the transmitter so that it will transmit output pressures through line 21 whose value are in accord with the temperature or pressure force acting on Bourdon tube 22.

If the pneumatic transmitter 14 is connected to the thermal responsive element 18 which is filled with an expansible liquid responsive to temperature changes, the Bourdon coil will function in the same manner as where it is connected direct to the pressure of the pump feed line 3. Consequently the pneumatic transmitter 14 will send out pressure to the totalizer operator 10 in accordance with temperature changes of the tempered water flowing to the pump, and the pneumatic transmitter 15 will deliver a sending pressure through conduit 12 to the totalizer operator 10 in accordance with changes in the static pressure of the fluid flowing from the deaerating heater. Since the system is designed to maintain a predetermined temperature pressure relation of the feed water on the suction side of the pump 1, any pressure differential resulting from a pressure temperature differential in the flow line from the deaerating heater will cause the totalizer 10 to operate the valve 7 to regulate the flow of the cold water to the flow line 3 to thereby maintain the desired temperature pressure relation of the feed water that prevents flashing at the suction side of the pump 1.

The totalizer operator 10 is more clearly shown in Fig. 4 of the drawing and consists of a plurality of end brackets 29 and 30 connected by bolts 31 to a sectional housing comprising the members 32 and 33 which are separated by a partition 34 having a vent 35 to form a plurality of chambers 36 and 37 having threaded connections 38 and 39, respectively, with the conduits 12 and 13 of the pneumatic transmitters 14 and 15.

A source of pressure fluid 11 is supplied through the connection 40 and is controlled by a valve 41 having a stem 42 normally biased by a coil spring 43 to closed position. The valve stem 42 also controls a vent 44 leading through the vent 35 to the atmosphere. The outlet 45 of the totalizer is connected to the conduit 9 of the valve operator 8 shown in Fig. 1. The vent 44 is provided in a flanged abutment or disc 46 which is mounted on a flexible diaphragm 47, the periphery of which is clamped between the member 33 and end bracket 30 of the totalizer. A similar flexible diaphragm 48 is mounted between the member 32 and the end bracket 29. The valve abutment 46 is further biased by coil springs 49 and 50, the latter being adjustable by a set screw 51 which is protected by a cap 52. Spring 50 is preset so that the totalizer will remain inoperative until the pressure temperature differential reaches a predetermined value in chambers 36 and 37, as established by transmitters 14 and 15, after which it operates to regulate the supply of cold water to the feed water. The system is responsive to the tempered water passing thermal element 18 and will therefore regulate the flow of cold water so that the resultant pressure temperature differential is maintained at the desired value.

In the modification shown in Fig. 2 of the drawing the control of pressure temperature in the feed water line from the deaerating heater to the pump is regulated by the make-up steam instead of the cold water supply, and a valve 53 is connected in the supply line 54 to the deaerating heater to regulate the flow of steam in response to a sending pressure delivered to the valve operator 55 through conduit 56 from the totalizer operator 10 at its sending connection 45. As will be observed from the illustration of Fig. 2, water and steam are introduced to the deaerating heater 4. The relative proportions of steam and water so introduced under ordinary circumstances would be sufficient to maintain the desired pressure temperature relationship in the feed line leading from the deaerating heater to the intake of the boiler feed pump 1. However, if the amount of steam delivered to the deaerating heater becomes deficient so that the pressure temperature relationship as determined by transmitters 14 and 15 becomes upset or departs from the desired value, then totalizer 10 causes valve 53 to be actuated or so positioned that make-up steam will be delivered to the deaerating heater in an amount sufficient to reestablish the desired pressure temperature relationship in the feed water supplied to the intake of the boiler feed pump 1.

As shown in Figs. 1, 2 and 3 of the drawings, the totalizer 10 has connections with a volume chamber 10' which eliminates hunting of the control valve.

In the system of control shown in Fig. 3 of the drawing the pressure temperature of the feed water is controlled both by regulating the supply of make-up steam by valve 53 as in the system of Fig. 2, and by a temperature regulation of the water delivered by the deaerating heater to line 56. In this system the water supply to the deaerating heater through coils 57' in conduit 57 passes through a heating jacket 58 which has a flow line connection 59 with the delivery side of the boiler feed water pump at 60. The connection 59 is provided with a throttle valve 61 which may be adjusted to regulate or control the volume of the feed water passing through the heating jacket 58 and out through the connection 62 to the feed line 56 from the deaerating heater.

It is to be noted that the conduit 62 is connected to the line 56 above the thermal responsive element 18 and the connection 19 for the pneumatic transmitter 15 so that the make-up steam supplied to the deaerating heater is regulated in the same manner as in the system of Fig. 2, except that in addition the system is responsive to the variation in temperature of the boiler feed water as effected by the heating of the supply water through the line 57.

If, for example, the volume or temperature of the water flowing to the deaerating heater changes, the temperature of the water flowing from the heating jacket 58 through conduit 62 will vary, thereby effecting a corresponding adjustment of the valve 53 controlling the make-up steam for the deaerating heater. Desirable operating conditions are preliminarily established by regulation of the throttle valve 61 to pass a desired volume of feed water to the heater 58 through which the water is supplied to the deaerating heater and the system of control will thereafter maintain such predetermined or desirable conditions substantially constant.

Although several modifications of the invention have been herein illustrated and described, it will be evident to those skilled in the art that changes may be made in the details of construction and in the arrangement of the operating parts without departing from the principles herein set forth.

I claim:

1. In a system for controlling the pressure-temperature relationship of a boiler feed water supply, a deaerating heater, a feed water pump having the inlet connected to said heater, a water supply for said deaerating heater, a heating jacket for said water supply having a connection to the outlet side and another connection to the inlet side of said pump whereby the water supplied to said deaerating heater is heated in accordance with the temperature and rate of flow of water from the outlet of said pump, and a throttle valve connected in said heater connection to the pump outlet side for regulating the volume of flow of feed water through said heating jacket, a source of supply of make-up steam for said deaerating heater, and means responsive jointly to the pressure and temperature of the water at the intake of said pump for regulating the flow of steam into said deaerating heater to maintain a predetermined relationship between the pressure and temperature of the feed water at said pump intake.

2. In a system for controlling the pressure-temperature relationship of a boiler feed water as delivered to the intake of a boiler feed water pump, a deaerating heater, a boiler feed water pump having its intake connected to the outlet of said deaerating heater, a source of make-up steam for said deaerating heater, source of supply of water for said heater, means for regulating the volume of make-up steam supplied to said deaerating heater, a heater through which the water supplied to the deaerating heater flows, means for passing feed water delivered by said boiler feed pump through said last mentioned heater and thence back to the inlet of said pump whereby the water supplied to said deaerating heater is heated in accordance with the temperature and volume of feed water delivered by said pump, means responsive to the temperature and means responsive to the pressure of feed water delivered to the intake of said pump from both the deaerating heater and that supplied from said pump through the said second heater, and means actuated jointly in response to said temperature and pressure responsive means for actuating said make-up steam regulator in accordance with the temperature-pressure relationship of said feed water.

3. In a system for controlling the temperature-pressure relationship of boiler feed water as delivered to the intake of a boiler feed pump, a deaerating heater, a boiler feed pump having its intake connected to the outlet of said deaerating heater, a source of supply of water for said deaerating heater, a valve for regulating the volume of make-up steam delivered to said deaerating heater, means actuated by air pressure for operating said valve, temperature and pressure responsive elements in the feed water line adjacent the intake to said feed pump, a transmitter for delivering operating air pressure to said valve actuating means, said transmitter having means responsive jointly to said temperature and pressure responsive means, whereby the air pressure delivered to said valve actuating means by said transmitter is in accordance with said joint response, and means for heating the water supplied to said deaerating heater comprising a heater through which said water flows, said heater being connected across the outlet and inlet of said feed pump whereby water is delivered by the pump to the heater and from the heater to the intake of said pump, the water returning to the intake of the pump being delivered to the feed line at a point between said temperature responsive means and the outlet of said deaerating heater.

WILLIAM WELCH, Jr.

REFERENCES CITED

The following references are of record in the file of this patent:

UNITED STATES PATENTS

| Number | Name | Date |
| --- | --- | --- |
| 1,630,956 | Luehrs | May 31, 1927 |
| 1,815,439 | LaMont | July 21, 1931 |
| 1,901,216 | Wilson | Mar. 14, 1933 |
| 2,095,238 | Coffin | Oct. 12, 1937 |
| 2,169,935 | Vorkauf | Aug. 15, 1939 |
| 2,372,087 | Karassik | Mar. 20, 1945 |

FOREIGN PATENTS

| Number | Country | Date |
| --- | --- | --- |
| 509,746 | Great Britain | July 20, 1939 |